United States Patent
Bishwas (10) Patent No.: US 12,371,805 B2
(45) Date of Patent: Jul. 29, 2025

(54) RACK-MOUNT BOX FOR A HEAT-EMITTING DEVICE

(71) Applicant: Hymeth ApS, Soborg (DK)

(72) Inventor: Sumon Bishwas, Copenhagen (DK)

(73) Assignee: HYMETH APS (DK)

( * ) Notice: Subject to any disclaimer, the term of this patent is extended or adjusted under 35 U.S.C. 154(b) by 658 days.

(21) Appl. No.: 17/415,177

(22) PCT Filed: Sep. 23, 2019

(86) PCT No.: PCT/EP2019/075483
§ 371 (c)(1),
(2) Date: Jun. 17, 2021

(87) PCT Pub. No.: WO2020/126135
PCT Pub. Date: Jun. 25, 2020

(65) Prior Publication Data
US 2022/0056598 A1    Feb. 24, 2022

(30) Foreign Application Priority Data
Dec. 20, 2018   (EP) ..................................... 18214709

(51) Int. Cl.
*C25B 9/67*    (2021.01)
*C25B 1/04*    (2021.01)
(Continued)

(52) U.S. Cl.
CPC .................. *C25B 9/67* (2021.01); *C25B 1/04* (2013.01); *C25B 9/73* (2021.01); *F24H 3/04* (2013.01)

(58) Field of Classification Search
None
See application file for complete search history.

(56) References Cited

U.S. PATENT DOCUMENTS 4,589,712 A  *  5/1986  Hastings ............... G07F 19/205
                                                        312/312
5,460,441 A     10/1995  Hastings et al.
(Continued)

FOREIGN PATENT DOCUMENTS

CN           2141417        9/1993
CN         202881402 U      4/2013
(Continued)

OTHER PUBLICATIONS

English abstract of JP S64-057797 A (Year: 1989).*
(Continued)

*Primary Examiner* — Harry D Wilkins, III
(74) *Attorney, Agent, or Firm* — McAndrews, Held & Malloy, Ltd.

(57) ABSTRACT

A rack-mount box (1") for a heat-emitting device, wherein the rack-mount box (1") comprises: a housing (3') forming a heat-emitting device chamber, and a heat-emitting device holding structure (77) arranged in the heat-emitting device chamber and configured to support a heat-emitting device, a cool air inlet (71) arranged vertically below the heat-emitting device holding structure (77), configured to enable cool air to flow into the heat-emitting device chamber, the heat-emitting device holding structure (77) being configured to enable cool air to flow vertically past the heat-emitting device holding structure (77), wherein the housing (3) has a wall (3d) provided with a hot air outlet (73) arranged vertically above the heat-emitting device holding structure (77) to enable heated air received into the heat-emitting device chamber as cool air via the cool air inlet (71) to exit the heat-emitting device chamber, wherein the housing (3) has a roof structure (79) extending inwards in the heat-emitting chamber, the roof structure (79) being configured to (Continued)

direct heated air in the heat-emitting device chamber towards the hot air outlet (73).

15 Claims, 7 Drawing Sheets

(51) Int. Cl.
*C25B 9/73* (2021.01)
*F24H 3/04* (2022.01)

(56) References Cited

U.S. PATENT DOCUMENTS

| | | | |
|---|---|---|---|
| 6,324,056 | B1 | 11/2001 | Breier et al. |
| 2003/0011974 | A1 | 1/2003 | Curlee et al. |
| 2003/0148171 | A1* | 8/2003 | Mitlitsky ............... C25B 15/00 429/61 |
| 2004/0104120 | A1* | 6/2004 | Wang ................ H01L 21/6723 204/198 |
| 2011/0240486 | A1* | 10/2011 | Yoshida ................ C25B 9/00 205/744 |
| 2012/0010754 | A1* | 1/2012 | Matteson ........... H05K 7/20836 361/679.48 |
| 2015/0159898 | A1* | 6/2015 | Jung ................. G05D 23/1919 700/276 |
| 2015/0208551 | A1 | 7/2015 | Davidson |
| 2016/0333487 | A1 | 11/2016 | Rogriquez |
| 2017/0247800 | A1* | 8/2017 | Lacroix ................. C25B 9/00 |
| 2019/0376196 | A1* | 12/2019 | Mohri .................. C25B 15/02 |
| 2020/0010961 | A1* | 1/2020 | Kazuno ................. C25B 9/70 |
| 2020/0010966 | A1* | 1/2020 | Kazuno ................ C25B 15/02 |

FOREIGN PATENT DOCUMENTS

| | | | | |
|---|---|---|---|---|
| CN | 107708348 | | 2/2018 | |
| DE | 29823495 | | 7/1999 | |
| JP | S64-057797 A | * | 3/1989 | ............... H05K 7/20 |
| JP | H03177096 A | | 8/1991 | |
| JP | H04335597 | | 11/1992 | |
| JP | 3122283 U | | 6/2006 | |
| JP | 2007505998 A | | 3/2007 | |
| JP | 2015527673 A | | 9/2015 | |
| KR | 1020090118538 | | 11/2009 | |
| KR | 101607911 B1 | * | 4/2016 | ............... H02B 1/56 |

OTHER PUBLICATIONS

Machine translation of KR 101607911 B1 (Year: 2016).*
Written Opinion for Singapore Patent Application No. 11202105947V dated Mar. 20, 2023, 6 pages.
Search Report for Singapore Patent Application No. 11202105947V dated Mar. 17, 2023, pp. 1-3.
EPO Extended Search Report for EPO Application No. 18214709.0 mailed Oct. 24, 2019, 11 pages.
Anderson, Kevin, et al., "Star CCM+CFD Simulations of Enhanced Heat Transfer in High-Power Density Electronics Using Forced Air Heat Exchanger and Pumped Fluid Loop Cold Plate Fabricated from High Thermal Conductivity Materials," Journal of Electronics Cooling and Thermal Control, Dec. 2013, vol. 3, pp. 144-154.
Teng, Ho, et al., "Design of Direct and Indirect Liquid Cooling Systems for High-Capacity, High-Power Lithium-Ion Battery Packs," SAE Int. J. Alt. Power, vol. 1, Issue 2, Dec. 2012, pp. 525-536.
International Search Report and Written Opinion corresponding to International Patent Application No. PCT/EP2019/075483, mailed Nov. 20, 2019.
Examination Report for Indian Patent Application No. 202147031801 dated Jan. 5, 2023, 4 pages.
Office Action ("Notice of Reasons for Rejection") for Japanese Patent Application No. 2021-534965 dated Jul. 25, 2023, 10 pages.
Preliminary Office Action for Brazilian Patent Application No. BR112021010603-0 dated May 4, 2023, 5 pages.
Office Action for European Patent Application No. 19772732.4 dated Jan. 25, 2024, 34 pages.
Office Action for Korean Patent Application No. 10-2021-7022870 dated Aug. 9, 2024, 18 pages.
Office Action for Chinese Patent Application No. 201980084784.1 dated Oct. 17, 2024, 24 pages.

* cited by examiner

RACK-MOUNT BOX FOR A HEAT-EMITTING DEVICE

CROSS-REFERENCE TO RELATED APPLICATIONS/INCORPORATION BY REFERENCE

The present application is the U.S. national phase under § 371 of International Application No. PCT/EP2019/075483, having an international filing date of Sep. 23, 2019, which claims priority to EP Patent Application No. 18214709.0, filed Dec. 20, 2018. Each of the above-mentioned prior-filed applications is hereby expressly incorporated herein by reference in its entirety.

TECHNICAL FIELD

The present disclosure relates to cooling of heat-emitting devices such as high-pressure electrolysers.

BACKGROUND

Electrolysis of water is a process in which water molecules are decomposed, forming hydrogen gas and oxygen gas. This process occurs as a result of an electric current flowing between two electrodes submerged in water.

For certain applications it may be desirable to compress the hydrogen gas and the oxygen gas generated in the electrolysis process. Traditionally, this gas compression has been made once the gas had been discharged from the electrolyser system.

More recently, it has been proposed to perform gas compression already during electrolysis. An example of a high-pressure electrolyser system is disclosed in US 20050072688 A1. The system includes a pump for pumping water into electrolytic cells, a check-valve preventing water to flow back to the pump and an electrolyser stack comprising the electrolytic cells.

Due to the high pressure in the electrolyser, there will be additional heat development inside the electrolyser. The electrical resistivity is thus increased, resulting in a loss of efficiency of the electrolyser.

SUMMARY

In some applications it may be desirable to rack-mount an electrolyser. A rack-mounted electrolyser may need to fulfil certain standard dimensions. For example, the electrolyser may need to have a width dimension that fits in a standard 19-inch rack. This small size may provide challenges with the cooling of the electrolyser.

In view of the above, a general object of the present disclosure is to provide a rack-mount box for a heat-emitting device which solves or at least mitigates the problems of the prior art.

There is hence according to a first aspect of the present disclosure provided a rack-mount box for a heat-emitting device, wherein the rack-mount box comprises: a housing forming a heat-emitting device chamber, and a heat-emitting device holding structure arranged in the heat-emitting device chamber and configured to support a heat-emitting device, a cool air inlet arranged vertically below the heat-emitting device holding structure, configured to enable cool air to flow into the heat-emitting device chamber, the tray being configured to enable cool air to flow vertically past the heat-emitting device holding structure, wherein the housing has a wall provided with a hot air outlet arranged vertically above the heat-emitting device holding structure to enable heated air received into the heat-emitting device chamber as cool air via the cool air inlet to exit the heat-emitting device chamber, wherein the housing has a roof structure extending inwards in the heat-emitting chamber, the roof structure being configured to direct heated air in the heat-emitting device chamber towards the hot air outlet.

Ambient air is hence used for cooling the external surfaces of the heat-emitting device arranged inside the housing of the rack-mount box. By the continuous circulation of cool air through the housing, no extra motorised cooling such as fans is necessary. The cooling may hence be made less energy consuming and less noisy. Moreover, the rack-mount box may be made more compact, easier to maintain since fans draw dust and a box provided with fans would require cleaning, and more cost efficient.

The heat-emitting device may for example be a high-pressure electrolyser stack, a power supply unit for a high-pressure electrolyser stack or a pump.

According to one embodiment the roof structure is pyramid shaped, V-shaped or has the shape of a right-angled triangle.

According to one embodiment the roof structure has an inclined surface configured to direct heated air towards the hot air outlet.

The pyramid shaped roof structure, V-shaped roof structure or right-angled triangle shaped roof structure hence has an inclined surface which is configured to direct heated air towards the hot air outlet. The inclined surface may be inclined relative to a horizontal plane, a defined by the heat-emitting device holding structure or a plane defined by a planar outer roof of the housing.

The heat-emitting device holding structure may comprise a tray and a rail assembly supporting the tray. The tray may be configured to slide along the rail assembly such that the tray can be slid out from the housing.

The rack-mount box may comprise stands. The rail assembly may be provided with a support wheel for supporting the rail assembly when the tray is slid out from the housing. The support wheel may be centrally arranged along a median plane relative to the sides or side walls of the rack-mount box.

Alternatively, the heat-emitting device holding structure may comprise a rail assembly onto which the heat-emitting device may be placed directly. In this case, the rail assembly acts as support/tray for the heat-emitting device.

According to one embodiment the roof structure is pyramid shaped, and wherein several non-parallel walls of the housing are provided with a hot air outlet, the pyramid shaped roof structure being configured to direct heated air to the hot air outlets.

According to one embodiment only one wall of the housing is provided with a hot air outlet, and wherein the roof structure has the shape of a right-angled triangle having its inclined surface in the form of a hypotenuse surface facing the hot air outlet.

According to one embodiment the cool air inlet is arranged in an underside of the housing or is provided in a wall of the housing.

According to one embodiment the cool air inlet is provided in the wall, and the wall is a front wall, a rear wall or a side wall.

According to one embodiment the cold air inlet, and the hot air outlet are provided in opposite walls of the housing.

According to one embodiment the housing is made of a heat-insulating material. The heated air will thereby not heat up the housing itself and instead just leave through the hot air outlet.

According to one embodiment the heat-insulating material comprises a polymer or wood.

There is according to a second aspect of the present disclosure provided a rack-mount box assembly comprising a first rack-mount box and a second rack-mount box according to the first aspect arranged side by side, wherein each of the first rack-mount box and the second rack-mount box has a front wall, a rear wall and only one side wall, wherein the heat-emitting device chamber of the first rack-mount box and the heat-emitting device chamber of the second rack-mount box are open towards each other to thereby form a single heat-emitting device chamber.

There is according to a third aspect of the present disclosure provided a heat-emitting device system comprising: the rack-mount box according to the first aspect, and a heat-emitting device supported by or suspended from the heat-emitting device holding structure.

The heat-emitting device may for example be a high-pressure electrolyser stack, a pump or a power supply such as a power supply for a high-pressure electrolyser stack or for a pump.

According to one embodiment the heat-emitting device system is a high-pressure electrolyser system and the heat-emitting device is a high-pressure electrolyser stack.

According to one embodiment the electrolyser stack comprises a plurality of electrolytic cells, each electrolytic cell comprising two electrode plates wherein each electrode plate has a perimeter provided with heat fins.

According to one embodiment the electrolyser stack has an electrolyser cooling channel inlet and an electrolyser cooling channel outlet.

There is hence according to a fourth aspect of the present disclosure provided a rack-mount box for a heat-emitting device, wherein the rack-mount box comprises: a housing forming a heat-emitting device chamber, and a heat-conducting cooling tray arranged in the heat-emitting device chamber and configured to support a high-pressure electrolyser stack, wherein the cooling tray comprises a cooling fluid channel which has a cooling fluid channel inlet and a cooling fluid channel outlet, for flowing a cooling fluid in the cooling tray to thereby provide cooling of the cooling tray.

The rack-mount box and in particular the cooling tray which supports the electrolyser stack facilitates the cooling of the heat-emitting device. In particular, the cooling tray acts as a heat sink for the heat-emitting device such as an electrolyser stack. The requirements on and hence the size of the internal cooling system of the heat-emitting device may thereby be reduced, whereby the heat-emitting device, such as an electrolyser stack may be made smaller to fit in a standardised rack.

According to one embodiment the housing has a first side wall provided with a plurality of first air inlet openings distributed along the first side wall and configured to provide ambient air into the heat-emitting device chamber.

Ambient air cooling via the first air inlet openings may further provide cooling of the electrolyser stack in the heat-emitting device chamber.

According to one embodiment the housing has a second side wall opposite to the first side wall, provided with a plurality of second air inlet openings distributed along the second side wall and configured to provide ambient air into the heat-emitting device chamber.

According to one embodiment the cooling tray comprises a plurality of tray segments arranged in a stacked configuration, thereby forming the cooling tray.

The manufacturing of the cooling tray, which contains the cooling fluid channel, may thereby be facilitated. For example, a monolithic structure may be cut by laser during manufacturing to form the cooling tray segments which may then be provided with channel segments that form part of the cooling fluid channel.

According to one embodiment the tray segments are stacked in a direction parallel with a main extension of the cooling fluid channel.

According to one embodiment the cooling tray has two outermost tray segments and a plurality of tray segments arranged between the two outermost tray segments, wherein the two outermost tray segments are made of a different material than the other tray segments.

The two outermost tray segments may be compression plates which hold the tray segments arranged between them. The tray segments may for example be held by means of compression screws or bolts. The outermost tray segments may for example be made of a lightweight dielectric material such as carbon fibres. The tray segments arranged between the two outermost tray segments are preferably made of a material with a high thermal conductivity, such as metal, for example aluminium, copper, or steel, or of a heat conductive polymer.

According to one embodiment the cooling fluid channel has a coil structure. The cooling fluid will thereby take several turns inside the cooling tray, making cooling more efficient.

According to one embodiment the housing has a roof structure forming a roof of the heat-emitting device chamber, wherein the first side wall has an open window arranged between the roof structure and the first air inlet openings and the second side wall has an open window arranged between the roof structure and the second air inlet openings, and wherein the roof structure is configured to direct air received via the first inlet openings and the second inlet openings into the heat-emitting device chamber out through the open windows.

The roof structure facilitates the natural convection of air entering the heat-emitting device chamber through the first air inlet openings and the second air inlet openings. Cooling of the electrolyser stack may thereby be made more efficient.

Due to the roof structure, which directs air laterally, several rack-mount boxes may be stacked on top of each other in a rack with maintained efficient ambient air cooling.

According to one embodiment the roof structure has a pyramid shape which extends inwards in the heat-emitting device chamber. The pyramid shape deflection/steers the cooling air in the heat-emitting device chamber towards the open windows.

The roof structure may have four facets forming the pyramid shape. Each facet may be configured to direct air towards a respective open window. Hereto, the housing may be provided with four open windows, one on each side of the housing. Each open window may be arranged in a region of the roof structure, in particular vertically below the roof structure. The pyramid structure hence steers the air flow towards the four open windows.

One embodiment comprises at least one resilient support element configured to support the cooling tray and to damp vibrations of the cooling tray. Vibrations generated by a pump/motor which pumps water under high pressure into the electrolyser stack may thereby be absorbed to reduce vibration propagation to the rack-mount box. Vibration-induced noise may thereby be reduced.

One embodiment comprises an outer roof and an inner roof arranged below the outer roof, a tube connected to the cooling fluid channel outlet and a hopper connected to the tube, the outer roof having an air outlet window and the inner roof having an inner window for ambient hot air, the hopper being connected to the inner roof to thereby provide a fluid connection between the heat-emitting device chamber and a space between the inner roof and the outer roof to thereby mix air steam from the cooling fluid channel outlet and the ambient hot air flowing through the inner window.

Due to the mixing the ambient hot air will obtain some momentum, whereby it is able to travel through a pipeline connected to the air outlet window. The hot air may thereby be used for heating purposes.

There is according to a fifth aspect of the present disclosure provided a high-pressure electrolyser system comprising: the rack-mount box according to the first or fourth aspect, and a high-pressure electrolyser stack arranged in the heat-emitting device chamber on the tray, which tray is a cooling tray.

According to one embodiment the electrolyser stack comprises a plurality of electrolytic cells, each electrolytic cell comprising two electrode plates wherein each electrode plate has a perimeter provided with heat fins.

According to one embodiment the first air inlet openings and the second air inlet openings are configured to provide cooling of the heat fins. The electrolyser stack with its lateral heat fins may hence be provided along the first side wall with its first air inlet openings and the second side wall with its second air inlet openings.

The heat fins provide additional cooling of the electrolyser stack. In particular, the interaction between the heat fins and the ambient air from the first air inlet openings and the second air inlet openings provides efficient air cooling of the electrolyser stack in addition to the cooling provided by the heat sink functionality of the cooling tray on the underside of the electrolyser stack.

According to one embodiment the electrolyser stack has an electrolyser cooling channel inlet in fluid connection with the cooling fluid channel inlet of the rack-mount box and an electrolyser cooling channel outlet in fluid connection with the cooling fluid channel outlet of the rack-mount box.

According to one embodiment the electrolyser cooling channel inlet and the electrolyser cooling channel outlet are arranged in an upper region of the electrolyser stack.

There is according to a sixth aspect of the present disclosure provided an electrode plate for an electrolyser stack, wherein the electrode plate comprises: a frame, wherein the frame includes a hydrogen gas channel and an oxygen gas channel, wherein the frame delimits a central through-opening of the electrode plate, wherein only one of the hydrogen gas channel and the oxygen gas channel is connected to the central through-opening, a water channel which is connected to the central through-opening, and a plurality of electrode elements extending from one side of the through-opening to another side of the through-opening, wherein the frame has a perimeter provided with a plurality of heat fins.

According to one embodiment the heat fins extend along a portion of the perimeter.

According to one embodiment the frame is provided with a fluid inlet and a fluid outlet for a cooling fluid, wherein the heat fins extend along the perimeter in a region of the fluid inlet and the fluid outlet.

According to one embodiment the heat fins extend along the entire perimeter of the frame.

The heat fins may for example be made of metal such as aluminium or copper.

There is according to a fourth aspect of the present disclosure provided an electrolyser stack comprising a plurality of electrode plates of the third aspect presented herein, forming electrolytic cells.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the inventive concept will now be described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
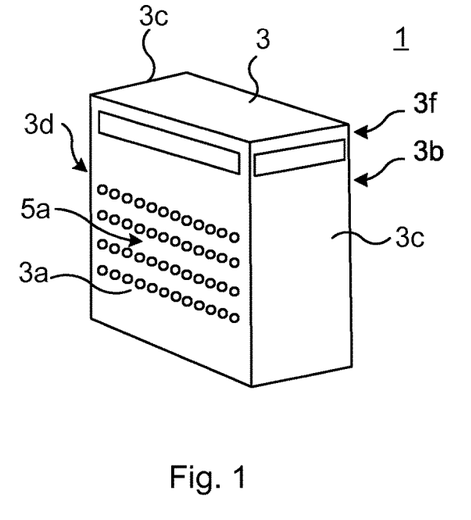
FIG. 1 schematically shows a perspective view of an example of a rack-mount box for an electrolyser stack.

FIG. 1 is a perspective view of an example of a rack-mount box 1 for a heat-emitting device such as an electrical, hydraulic or electrochemical device, e.g. an electric motor/pump, power supply or a high-pressure electrolyser stack. In the following the heat-emitting component will be exemplified by an electrolyser stack.

The rack-mount box 1 is configured to be rack-mounted in a rack. The rack-mount box 1 may for example be designed to be mounted in a standard 19-inch rack.

The rack-mount box 1 comprises a housing 3 forming a heat-emitting device chamber, in particular an electrolyser stack chamber, for an electrolyser stack. The housing 3 has a first side wall 3a and a second side wall 3b arranged opposite to the first side wall 3a. The housing 3 may furthermore have a front wall 3c, and a rear wall 3d arranged opposite to the front wall 3c. The exemplified housing 3 also has a roof 3e.

The first side wall 3a and the second side wall 3b may be dimensioned so that the rack-mount box 1 can be mounted in a standard rack. The first side wall 3a and the second side wall 3b may according to one example have a width of 19 inches or approximately 19 inches.

The first side wall 3a is provided with a plurality of first air inlet openings 5a. The first air inlet openings 5a are distributed along the first side wall 3a. The first air inlet openings 5a may for example be arranged in a plurality of rows along the first side wall 3a. The first air inlet openings 5a are configured to provide ambient air into the heat-emitting device chamber.

Figure 2:
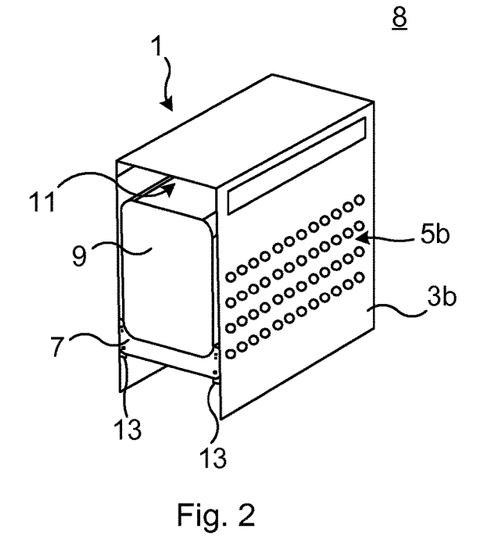
FIG. 2 schematically shows another view of the rack-mount box in FIG. 1 with a front wall removed.

The second side wall 3b is provided with a plurality of second air inlet openings 5b, as shown in FIG. 2. The second air inlet openings 5b are distributed along the second side wall 3b. The second air inlet openings 5b may for example be arranged in a plurality of rows along the second side wall 3b. The second air inlet openings 5b are configured to provide ambient air into the heat-emitting device chamber.

The first side wall 3a, the second side wall 3b and the roof 3e may be made of a heat-conducting material such as metal, or they may for example be made of a polymer, or even wood. The first side wall 3a, the second side wall 3b and the roof 3e do not have to conduct heat.

The exemplified housing 3 furthermore has a plurality of open windows 3f. In particular each one of the first side wall 3a, the second side wall 3b, the front wall 3c and the rear wall 3d may be provided with a respective open window 3e. The open windows 3f are configured to allow air which has entered through the first air inlet openings 5a and the second air inlet openings 5b into the heat-emitting device chamber to escape from the heat-emitting device chamber by natural convection. An electrolyser stack that is placed in the heat-emitting device chamber heats the air in the heat-emitting device chamber. The open windows 3f are arranged in a region of the roof 3e, in particular below the roof 3e. The open window 3f of the first side wall 3a is arranged between the first air inlet openings 5a and the roof 3e. The open window 3f of the second side wall 3b is arranged between the second air inlet openings 5b and the roof 3e.

FIG. 2 shows the rack-mount box 1 with the front wall 3c removed to expose the interior of the rack-mount box 1. The rack-mount box 1 comprises a cooling tray 7. The cooling tray 7 is arranged inside the housing 3. The cooling tray 7 is made of a heat-conducting material. The cooling tray 7 is configured to support an electrolyser stack 9. The electrolyser stack 9 and the rack-mount box 1 together form a high-pressure electrolyser system 8. The heat-emitting device chamber is in this example defined by the inner surfaces of the first side wall 3a, the second side wall 3b, the front wall 3c, the rear wall 3d, an inner roof structure ii of the roof 3e, and the cooling tray 7.

The rack-mount box 1 may have support members 13 and the cooling tray 7 may be standing on the support members 13. The support members 13 may for example be attached to or form part of the first side wall 3a and the second side wall 3b. The support members 13 may for example be ledges extending along the first side wall 3a and the second side wall 3b.

Figure 3:
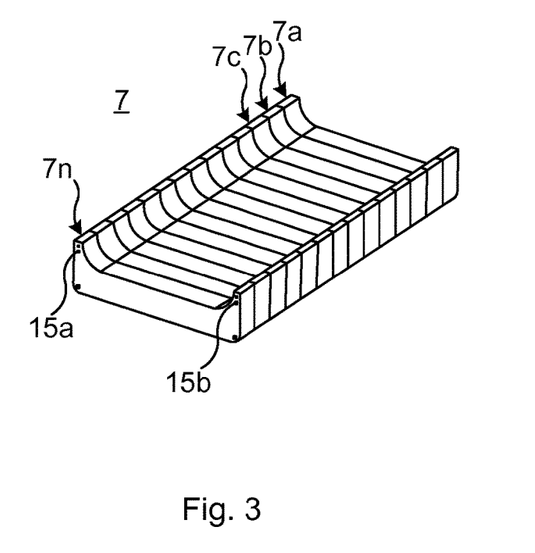
FIG. 3 schematically shows a perspective view of an example of a cooling tray.

FIG. 3 is a perspective view of an example of the cooling tray 7. The cooling tray 7 comprises a cooling fluid channel which extends inside the cooling tray 7. The cooling tray 7 has a cooling fluid channel inlet which is the inlet of the cooling fluid channel and a cooling fluid channel outlet 15b which is the outlet of the cooling fluid channel. The cooling fluid channel may for example have a coil structure. The cooling fluid channel may hence extend several times along the length of the cooling tray 7 between opposite ends thereof. The cooling fluid channel may thus have a plurality of turns as it extends between the cooling fluid channel inlet 15a and the cooling channel fluid outlet 15b. The cooling fluid channel is configured to allow a cooling fluid, such as a liquid, for example water, to flow in the cooling tray 7 to provide cooling of the cooling tray 7 and therefore of an electrolyser stack supported by the cooling tray 7.

The exemplified cooling tray 7 comprises a plurality of tray segments 7a, 7b, 7c, . . . 7n. The tray segments 7a, 7b, 7c, . . . 7n are arranged in a stacked configuration. The tray segments 7a, 7b, 7c, . . . 7n thereby form the cooling tray 7. The tray segments 7a, 7b, 7c, . . . 7n may for example be held together by means of compression rods and bolts. The tray segments 7a, 7b, 7c, . . . 7n may during manufacturing of the cooling tray 7 for example be formed by laser-cutting of a monolithic structure. The cooling fluid channel may thereafter be provided in each tray segment 7a, 7b, 7c, . . . 7n before they are assembled.

According to one example, the outermost tray segments 7a and 7n may be made of a different material than the other tray segments. The outermost tray segments 7a and 7n may for example be made of a material of high mechanical strength and low weight. The outermost tray segments 7a and 7n may for example be made of carbon fibre. The compression rods, bolts and fittings for the cooling fluid channel inlet 15a and the cooling fluid channel outlet 15b be flashed with the surface of the carbon fibre outermost tray segments 7a and 7n. The other tray segments may preferably be made of a material with high thermal conductivity, such as metal e.g. aluminium, copper, steel, or a heat conducting polymer.

Alternatively, the cooling tray could be a monolithic structure.

Figure 4:
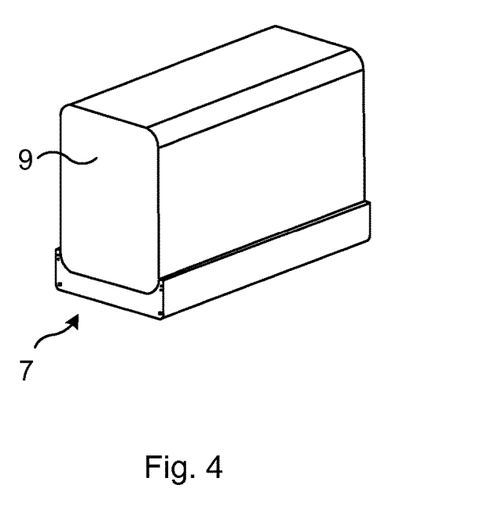
FIG. 4 schematically shows a perspective view of a cooling tray supporting an electrolyser stack.

FIG. 4 shows a perspective view of an electrolyser stack 9 arranged on the cooling tray 7. The bottom of the electrolyser stack 9 rests on the cooling tray 7.

Figure 5:
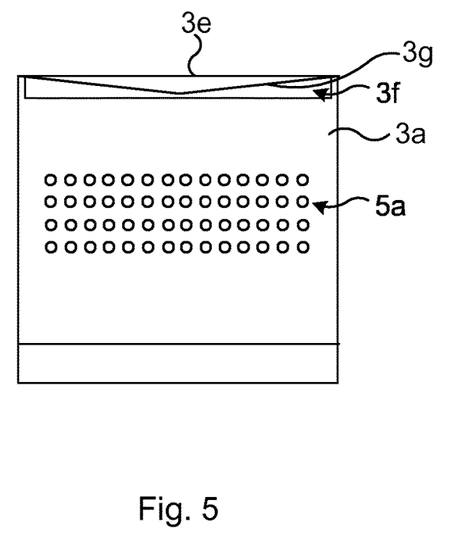
FIG. 5 is a side view of the electrolyser stack shown in FIG. 1.

FIG. 5 shows a side view of the rack-mount box 1. The roof 3e of the exemplified rack-mount box 1 has a roof structure 3g which is configured to direct air which has entered into the heat-emitting device chamber via the first air inlet openings 5a and the second air inlet openings 5b out through the open windows 3f. In the example shown in FIG. 5, the roof structure 3f has a pyramid shape which extends inwards in the housing 3. The pyramid shape hence has its tip vertically downwards relative to its base and the roof 3e.

Figure 6:
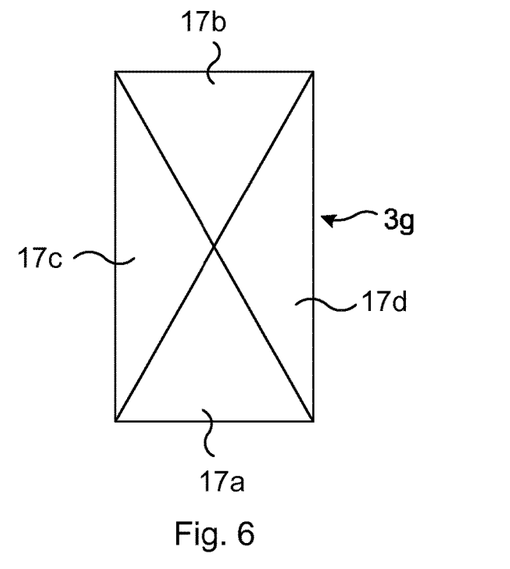
FIG. 6 schematically depicts a front view of a roof structure.

FIG. 6 shows a front view of the roof structure 3g. The roof structure 3g has a plurality of facets 17a-17d. In the present example, the roof structure 3g has four facets 17a-17d, which define the pyramid shape of the roof structure 3g. Each facet 17a-17d directs heated intake air from the first air inlet openings 5a and the second air inlet openings 5b to a respective open window 3f. Natural convection in the heat-emitting device chamber may thereby be facilitated.

Figure 7:
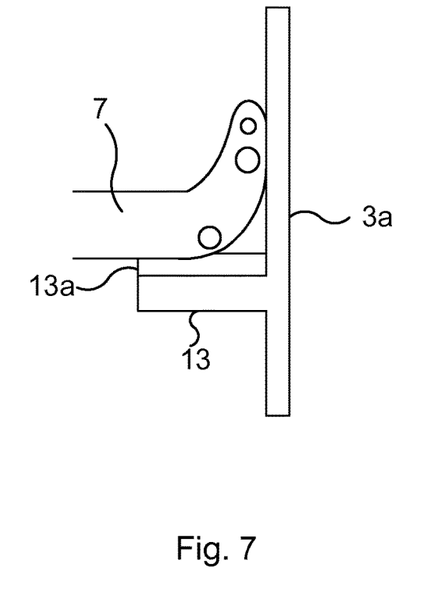
FIG. 7 is a close-up view of a support member holding a cooling tray.

FIG. 7 depicts a close-up view of a region carrying the cooling tray 7. The support structure 13 supports the cooling tray 7. The support structure 13 is provided with a resilient support element 13a. The cooling tray 7 rests on the resilient support element 13a. The resilient support element 13a is configured to absorb vibrations of the cooling tray 7. The vibrations may be generated by a pump/motor which pumps water with high pressure into the electrolyser stack 9 arranged on the cooling tray 7, for electrolysis, and which vibrations may propagate to the electrolyser stack 9. Each of the support structures 13 may be provided with a respective resilient support element 13a. The resilient support elements 13a may for example be made of polymer, rubber or cellulose-based material.

Figure 8:
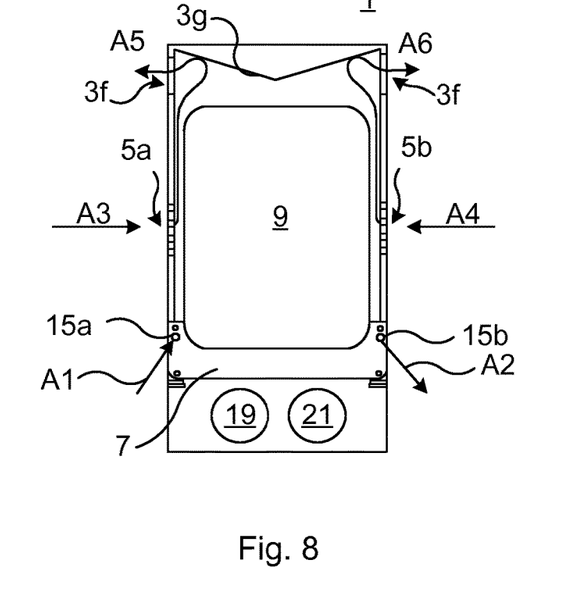
FIG. 8 is a cross-sectional view of the rack-mount box in FIG. 1.

FIG. 8 shows the functioning of the cooling provided by the rack-mount box 1 when the electrolyser stack 9 is installed in the heat-emitting device chamber. According to the illustrated example, the rack-mount box 1 may comprise gas cylinders arranged inside the rack-mount box 1. The rack-mount box 1 may comprise gas cylinder holders 19 and 21 configured to hold an oxygen gas cylinder and a hydrogen gas cylinder, respectively. Pressurised oxygen gas from the electrolysis may hence be stored in the oxygen gas cylinder and pressurised hydrogen gas from the electrolysis may be stored in the hydrogen gas cylinder, inside the rack-mount box 1. The gas cylinder holders 19 and 21 are in the present example arranged below the cooling tray 7.

Concerning the cooling operation, when the electrolyser stack 9 is being operated a cooling fluid such as water is directed into the cooling tray 7 and the cooling fluid channel via the cooling fluid channel inlet 15a as shown by arrow A1. The cooling fluid eventually flows out from the cooling tray 7 via cooling fluid channel outlet 15b as shown by arrow A2. Simultaneously, ambient air flows into the heat-emitting device chamber via the first air inlet openings 5a as shown by arrow A3 and the second air inlet openings 5b as shown by arrow A4. The ambient air which enters the heat-emitting device chamber in this manner cools the sides of the electrolyser stack 9. Due to natural convection, the heated air rises and is deflected by the roof structure 9 towards the open windows 3f where the heated air exits the housing 3, as shown by arrows A5 and A6. Cooling of the electrolyser stack 9 may hence be provided in two ways by means of the rack-mount box 1: 1) by means of the heat sink functionality of the cooling tray 7 due to the cooling fluid flowing through the cooling tray 7, and 2) by means of the ambient air and natural convection provided via the first air inlet openings 5a and the second air inlet openings 5b.

Figure 9:
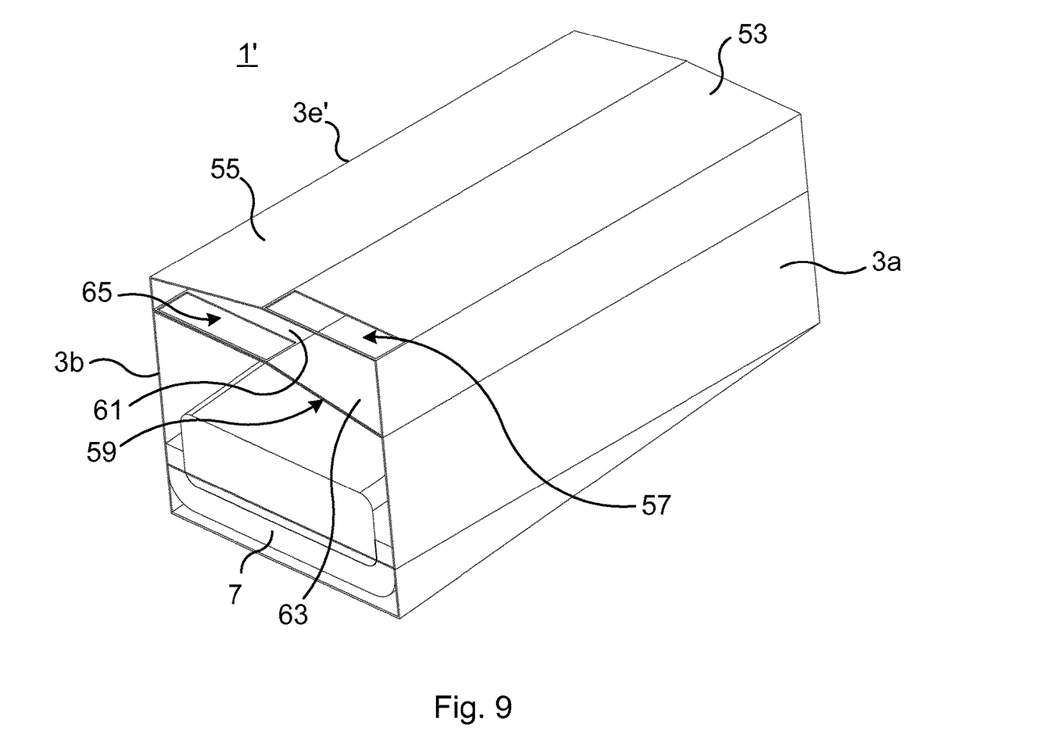
FIG. 9 is a perspective view of another example of a rack-mount box.

FIG. 9 shows another example of a rack-mount box. The rack-mount box 1' has a different roof 3e' than the rack-mount box 1. Although not shown in the figure, the first side wall 3a may be provided with the first air inlet openings and the second side wall 3b may be provided with second air inlet openings. The roof 3e' forms an outer roof and has a planar portion 53 arranged at a right angle or substantially right angle with one of the first side wall 3a and the second side wall 3b. The planar portion 53 extends between the front wall and the rear wall of the rack-mount box 1'. The roof 3e' also has an inclined portion 55 relative to the planar portion 53. The inclined portion 55 extends between the front wall and the rear wall. For example, half the roof 3e' may be formed by the planar portion 53 and the other half may be formed by the inclined portion 55. A fold line may be provided between the planar portion 53 and the inclined portion 55. In the example shown in FIG. 9, the planar portion 53 is provided with an air outlet window 57.

The rack-mount box 1' furthermore comprises an inner roof or inner level 59 separating the heat-emitting device chamber from the roof 3e'. The inner roof 59 is arranged between the cooling tray 7 and the outer roof 3e'. The inner roof 59 has a planar portion 61 arranged below the inclined portion 55 of the roof 3e', which extends between the front wall and the rear wall of the rack-mount box 1'. The inner roof 59 also has an inclined portion 63 relative to one of the first side wall 3a and the second side wall 3b arranged below the planar portion 53 of the roof 3e'. The inclined portion 63 extends between the front wall and the rear wall. The planar portion 61 and the inclined portion 63 may be separated by a fold line. The roof 3e' and the inner roof 59 may thus have an generally inverted structure relative to each other. The inner roof 61 is provided with an inner window 65. In particular, the planar portion 61 is provided with the inner window 65. The inner window 65 is hence arranged offset from the air outlet window 57 in a direction from the first side wall 3a to the second side wall 3b.

Both of the roof 3e' and the inner roof 59 are inclined relative to the front wall and the rear wall of the rack-mount box 1'. The inclination may be the same or substantially the same for the inner roof 59 and the roof 3e'. The inner window 65 and the air outlet window 57 are arranged in an uppermost region of the inclined roof 3e' and inner roof 59. Both the inner window 65 and the air outlet window 57 are hence arranged in a region of either the front wall or the rear wall.

Figure 10:
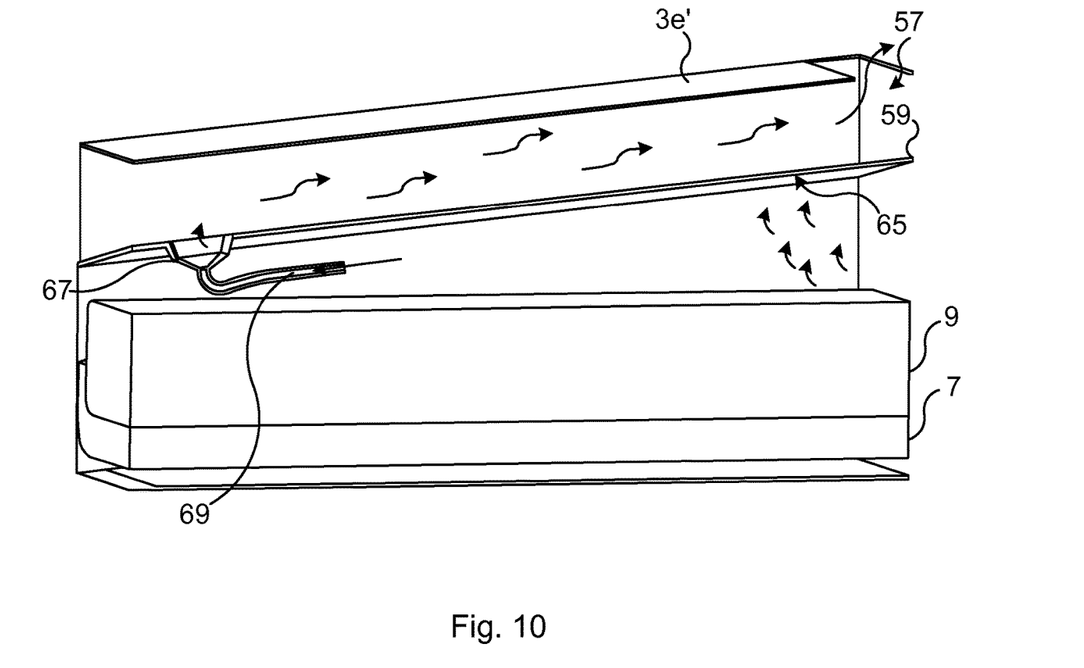
FIG. 10 is a side sectional view of the rack-mount box in FIG. 9.

FIG. 10 shows a sectional side view of the rack-mount box 1'. The rack-mount box 1' may furthermore comprise a hopper 67 and a tube 69 connected to the hopper 67. The hopper 67 is mounted to an opening in a lowermost portion of the inner roof 59 above the electrolyser stack 9. The hopper 67 hence provides a fluid connection between the heat-emitting device chamber and the space between the inner roof 59 and the roof 3e'. The tube 69 may be connected to an output of a fluid cooling system of the electrolyser stack 9 and to the cooling fluid channel outlet 15b of the cooling tray 7. The tube 69 is configured to carry hot steam from the fluid cooling system and the cooling fluid channel outlet 15b to the hopper 67. This steam/hot air will mix with the hot air flowing through the inner window 65 in the space between the inner roof 59 and the roof 3e'. Due to this mixing the ambient hot air will obtain some momentum, whereby it is able to travel through a pipeline connected to the air outlet window 57. The hot air may thereby be used for heating purposes.

Figure 11:
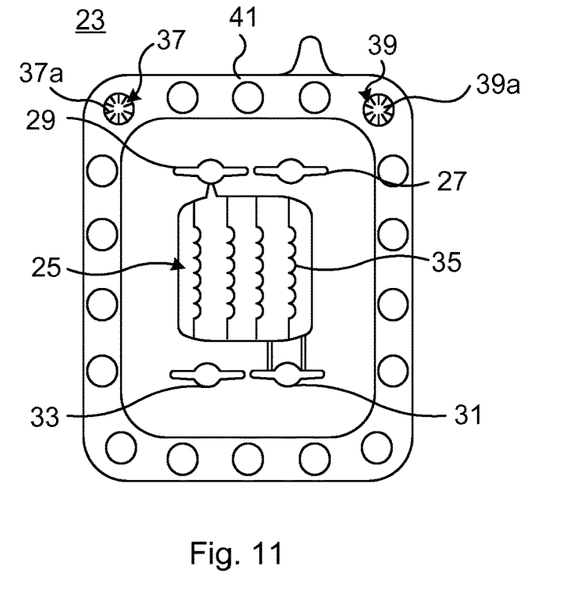
FIG. 11 schematically shows a front view of an example of an electrode plate.

The electrolyser stack 9 may according to one example be specifically adapted to the ambient air cooling. In particular, the electrode plates forming the electrolytic cells of the electrolyser stack 9 may be designed with a lateral heat fin structure to more efficiently interact with the ambient air entering the heat-emitting device chamber via the first air inlet openings 5a and the second air inlet openings 5b. FIG. 11 shows an example of an electrode plate 23 for an electrolyser. Two electrode plates 23 form an electrolytic cell, one acting as anode and the other one acting as cathode. A plurality of electrolytic cells may be stacked to form the electrolyser stack 9.

The electrode plate 23 comprises a frame 23a which delimits a central-through opening 25. The frame 23a includes a hydrogen gas channel 27 and an oxygen gas channel 29. For each electrode plate 23, only one of the hydrogen gas channel 27 and the oxygen gas channel 29 is in fluid connection with the central through-opening 25. The hydrogen gas channel 27 and the oxygen gas channel 29 are arranged in an upper region of the electrode plate 23. The electrode plates 23 are arranged alternatingly with every electrode plate 23 acting as anode having its oxygen gas channel 29 connected to the central through-opening 25 and every electrode plate 23 acting as cathode having its hydrogen gas channel 27 connected to the central through-opening 25.

The frame 23a furthermore includes water channels 31 and 33 of which for each electrode plate 23 only one is in fluid connection with the central through-opening 25. One of the water channels 31 is for the electrode plates that form an anode and the other water channel 33 is for the electrode plates that form a cathode.

The electrode plate 23 may furthermore comprise a plurality of electrode elements 35. The electrode elements 35 are arranged in parallel and extend vertically from one side of the central through-opening 25 to an opposite side of the central through-opening 25. Each electrode element 35 may for example comprise a central straight or essentially straight wire and a coil arranged around the central wire.

The electrode plate 23 furthermore comprises a fluid inlet 37 and a fluid outlet 39. Each one of the fluid inlet 37 and the fluid outlet 39 is a through-opening arranged in an upper region of the electrode plate 23 and the frame 23a. The fluid inlet 37 and the fluid outlet 39 are for providing a cooling fluid such as water, through the electrolyser stack 9. In particular, cooling fluid may enter the electrolyser stack 9 through the fluid inlets 37 and the exit the electrolyser stack 9 through the fluid outlets 39.

The fluid inlet 37 may according to one example be provided with a plurality of heat fin structures 37a. The heat fin structures 37a may for example comprise a plurality of radial elements distributed along the inner perimeter of the fluid inlet 37. The fluid outlet 39 may according to one example be provided with a plurality of heat fin structures 39a. The heat fin structures 39a may for example comprise a plurality of radial elements distributed along the inner perimeter of the fluid outlet 39.

Figure 12:
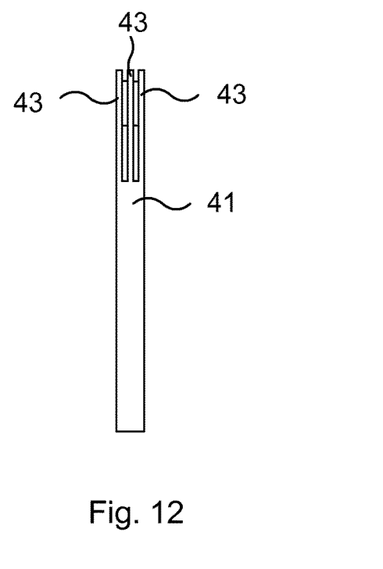
FIG. 12 shows the electrode plate in FIG. 11 from the side.
Figure 13:
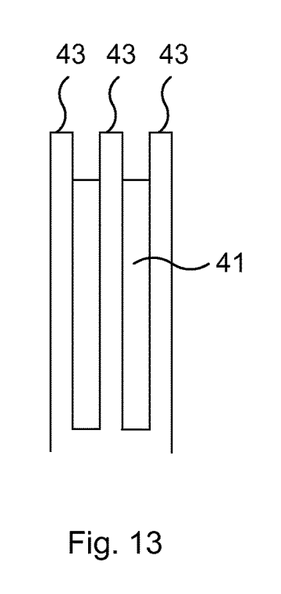
FIG. 13 shows a close-up view of the electrode plate in FIG. 11.

The frame 23a has an outer perimeter 41 which is provided with a plurality of heat fins to provide external cooling of the electrode plate 23. FIG. 12 shows a side view of the electrode plate 23. The heat fins 43 are arranged along the perimeter 41 of the frame 23 one after the other in the axial direction of the central through-opening 25. The heat fins 43 may for example be provided along only a portion of the perimeter 41, for example in an upper region or upper half of the electrode plate 23, or they may extend along the entire perimeter 41. FIG. 13 shows a close-up view of the heat fins 43.

The heat fins 43 are preferably made of a heat-conducting material such as a metal, for example aluminium or copper, or a heat conductive polymer.

Due to the external location of the heat fins 43, ambient air entering the rack-mount box 1 through the first air inlet openings 5a and the second air inlet openings 5b may provide better cooling of the electrolyser stack 9.

Figure 14:
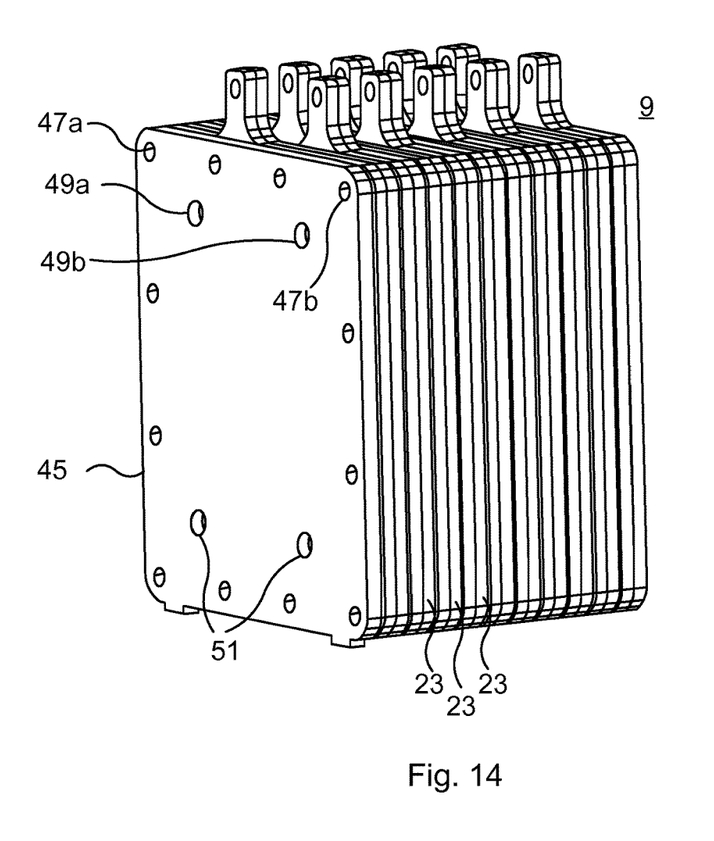
FIG. 14 schematically shows a perspective view of an electrolyser stack.

FIG. 14 shows the electrolyser stack 9 in more detail, comprising a plurality of the electrode plates 23 arranged in a stacked configuration. The electrolyser stack 9 includes end plates, such as end plate 45. The end plate 45 has an electrolyser cooling channel inlet 47a connected to the fluid inlets 37 of the electrode plates 23 and an electrolyser cooling channel outlet 47b connected to the fluid outlets 39 of the electrode plates 23, an oxygen gas outlet 49a, a hydrogen gas outlet 49b, and water inlets 51 for electrolysis connected to water channels 31 and 33. Water may be provided into the electrolyser stack 9 via the water inlets 51 at high pressure by means of a pump.

The end plates may for example be made of metal or carbon fibre. Carbon fibre is more lightweight and stronger to withstand high pressure than metal. In case the end plates are made of carbon fibre, the fittings for the electrolyser cooling channel inlet and outlet 47a and 47b, the water inlets 51, and oxygen gas outlet 49a and the hydrogen gas outlet 49b may be flashed with the surface of the carbon fibre end plates. The electrolyser stack 9 may be held together by means of compression rods and bolts, and these may also be flashed to the surface of the carbon fibre end plates.

The electrolyser cooling channel inlet 47a may be in fluid connection with the cooling fluid channel inlet 15a of the rack-mount box 7. The same fluid source may hence be connected to the electrolyser cooling channel inlet 47a and to the cooling fluid channel inlet 15a. The electrolyser cooling channel outlet 47b may be in fluid connection with the cooling fluid channel outlet 15b of the rack-mount box 1. The heated fluid exiting the electrolyser stack 9 and the cooling tray 7 may hence be united. The same fluid, e.g. water, cooling system may thereby be used for the internal fluid cooling of the electrolyser stack 9 and the external cooling provided by the cooling tray 7.

The electrolyser stack 9 may comprise additional cooling plates placed between electrolytic cells and/or between an electrolytic cell and an end plate. Although more cooling plates provide better cooling efficiency, the number of cooling plates is generally limited due to the rack-adapted size of the electrolyser stack 9.

Figure 15A:
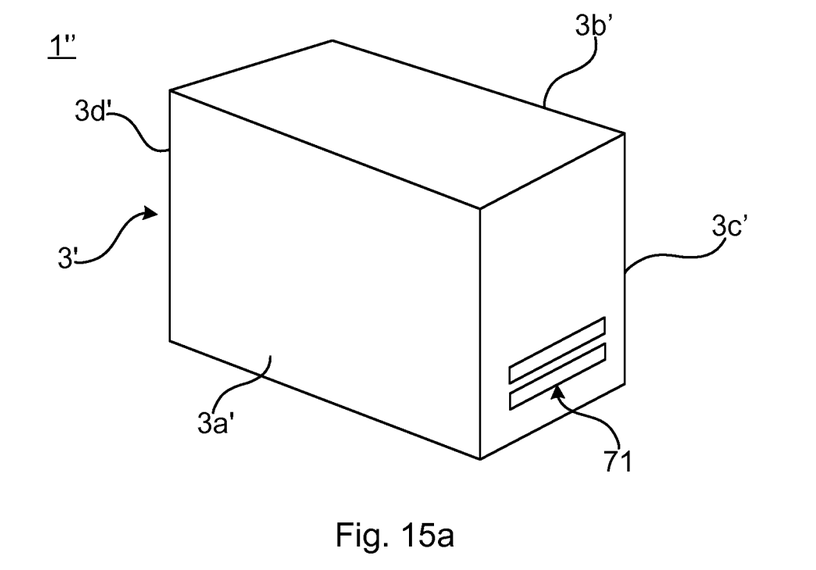
FIGS. 15a and 15b schematically show perspective views of an example of another example of a rack-mount box.
Figure 15B:
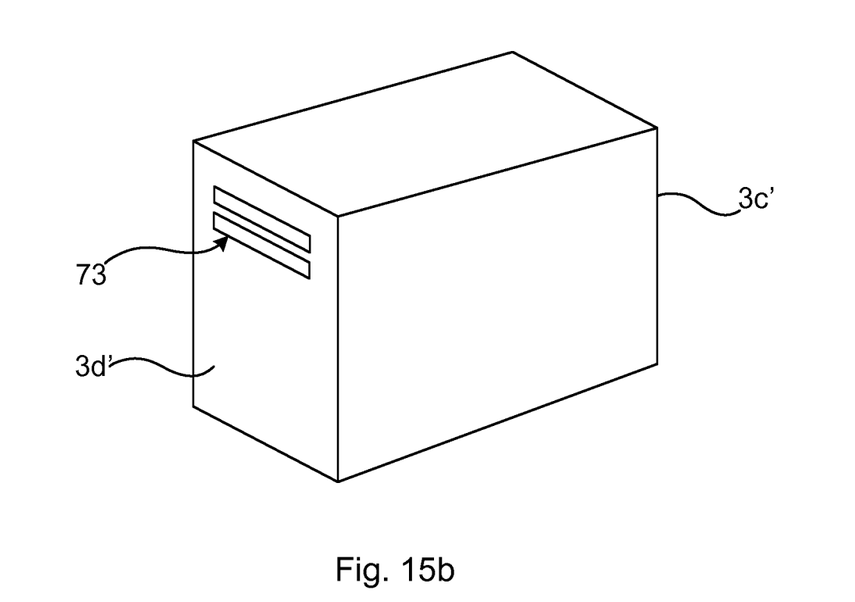

FIG. 15a shows another example of a rack-mount box 1". The rack-mount box 1" comprises a housing 3'. The housing 3' defines a heat-emitting device chamber configured to receive a heat-emitting device such as high-pressure electrolyser stack 9, a pump, a motor, or a power supply. The housing 3 may according to one example be made of a heat insulating material. The heat-insulating material may for example comprise or consist of a polymer material such as plastic or cellulose, or wood.

The housing 3' has two side walls 3a' and 3b'. The side walls 3a' and 3b' may be removable. The housing 3' also comprises a front wall 3c' and a rear wall 3d'. The front wall 3c' and the rear wall 3d' may be dimensioned with a specific rack width, such as 19 inches.

The rack-mount box 1" includes a heat-emitting device holding structure (not shown) configured to support or suspend a heat-emitting device. The heat-emitting device holding structure may for example comprise a tray. The tray may be a cooling tray such as previously described, or a tray without any specifically adapted cooling capabilities such as any kind of tray able to support a heavy heat-emitting device.

The heat-emitting device holding structure may comprise a rail assembly configured to support the tray or configured to suspend the tray. The tray may be slidably engaged with the rail assembly. The tray may be configured to slide along the rail assembly and thereby be pulled out at least partly from the housing 3'. The tray may hence be arranged as a carriage in the housing 3'. Alternatively, the heat-emitting device holding structure may comprise a rail assembly onto which the heat-emitting device may be placed directly or suspended from directly, i.e. without employing a tray.

The front wall 3c' and/or the rear wall 3d' may be provided with a cool air inlet 71. Alternatively, or additionally, the underside of the housing 3' may be provided with the cool air inlet 71. The cool air inlet 71 is configured to provide an inlet for cool air into the housing 3' and the heat-emitting device chamber. One or both side walls 3a' and 3b' may according to one variation be provided with a cool air inlet.

The cool air inlet 71 is arranged vertically below the heat-emitting device holding structure. The cool air inlet 71 is hence arranged between the bottom of the housing 3' and the heat-emitting device holding structure in a direction from the bottom towards the roof of the housing 3'. For example, the cool air inlet 71 is arranged vertically below the tray if a tray is present and/or below a rail assembly.

The heat-emitting device holding structure is configured to enable cool air having entered the heat-emitting device chamber through the cool air inlet 71 to flow past the heat-emitting device holding structure vertically upwards in the housing 3'. The heat emitting device support hence has an open structure to allow air to rise and flow past it. For example, in an example including a tray the tray may be provided with one or more through-openings extending in a direction towards the top of the housing 3' for the cold air to flow through. Cool air may thereby flow past the heat-emitting device arranged on the heat-emitting device holding structure for air cooling the heat-emitting device arranged on the heat-emitting device holding structure. The through-opening or through-openings are preferably arranged in such a way as to enable sufficient air to flow past and cool the heat-emitting device arranged on the heat-emitting device holding structure. The through-opening(s) may for example be underneath and along all sides of the heat-emitting device.

According to one example, that wall of the front wall 3c' and the rear wall 3d' which is not provided with an cool air inlet 71 may be provided with a hot air outlet 73. For example, if the front wall 3c' is provided with the cool air inlet 71, the rear wall 3d' may be provided with the hot air outlet 73. Alternatively, both the front wall and the rear wall may be provided with a respective hot air outlet. According to one example, one or both of the side walls 3a' and 3b' may be provided with a hot air outlet.

The hot air outlet 73 may be arranged vertically above the heat-emitting device holding structure. The hot air outlet 73 is hence arranged in a roof region of the housing 3'. The cold air inlet 71 may be arranged in a bottom region of the housing 3'. The hot air outlet 73 is configured to allow cold air that has entered the heat-emitting device chamber through the cool air inlet 71 and having been heated by the heat-emitting device, to exit the heat-emitting device chamber.

The housing 3' has a roof structure which extends inwards in the heat-emitting device chamber. The roof structure hence extends towards the bottom of the housing 3'. The roof structure is configured to facilitate the air flow from the cool air inlet to the hot air outlet 73 and hence enhance air circulation and cooling. The roof structure is configured to direct or divert heated air towards the hot air outlet 73.

Figure 16A:
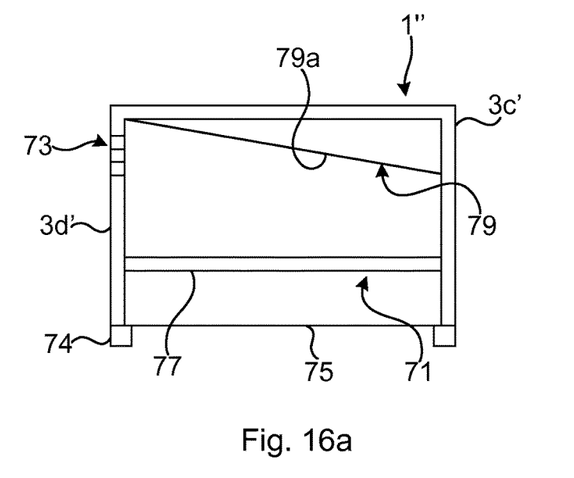
FIG. 16a is a sectional side view of an example of a rack-mount box.

FIG. 16a shows a sectional view from the side of one variation of the rack-mount box 1". This view shows the heat-emitting device holding structure 77.

The rack-mount box 1" is provided with stands or legs 74 which lift the housing 3' from the ground. Further, the bottom 75 of the housing 3' is open, forming a cool air inlet 71 underneath the heat-emitting device holding structure 77. Cool air is thereby able to flow underneath the housing 3' and flow into the heat-emitting device chamber through the cool air inlet 71.

Figure 16B:
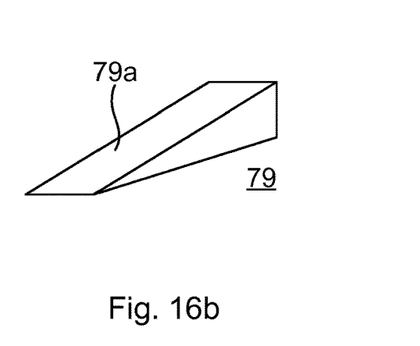
FIG. 16b schematically shows a perspective view of an example of a roof structure.

The exemplified roof structure 79 has in this case the shape of a right-angled triangle with its inclined surface 79a, the hypotenuse surface, facing the hot air outlet 73 to thereby direct heated air towards the hot air outlet 73. FIG. 16b shows a perspective view of the right-angled triangle shaped roof structure 79. The right-angled triangle may extend the entire distance between the front wall 3c' and the rear wall 3d', with the right-angled triangle tapering in a direction from the front wall 3c' towards the rear wall 3d'. The inclined surface 79a may form a planar surface.

Figure 16C:
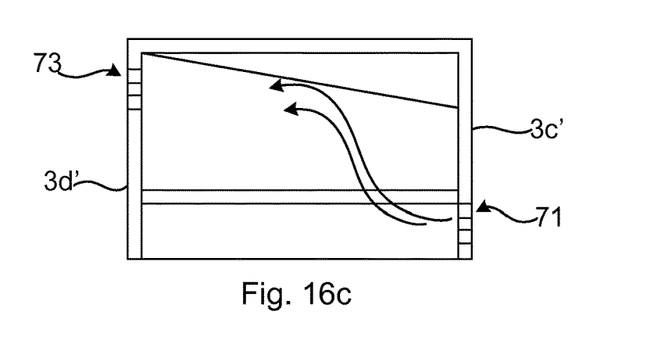
FIGS. 16c and 16d are sectional side views of examples of rack-mount boxes.

FIG. 16c shows a variation of the rack-mount box 1" shown in FIG. 16a. In this variation, the front wall 3d' is provided with the cool air inlet 71. The cool air inlet 71 provided in the front wall 3d' may be arranged there instead of or in addition to a cool air inlet being provided in the bottom of the housing 3'. The air flow 76 inside the heat-emitting device chamber is shown schematically. Typically, the heating of the cool air inside the heat-emitting device chamber would be provided by a heat-emitting device which for reasons of clarity is not shown inside the rack-mount box 1" in FIG. 16c.

Figure 16D:
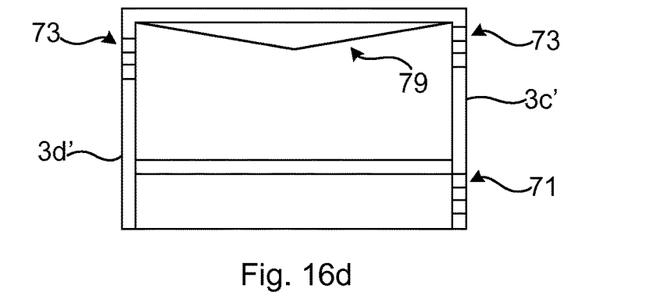
Figure 16E:
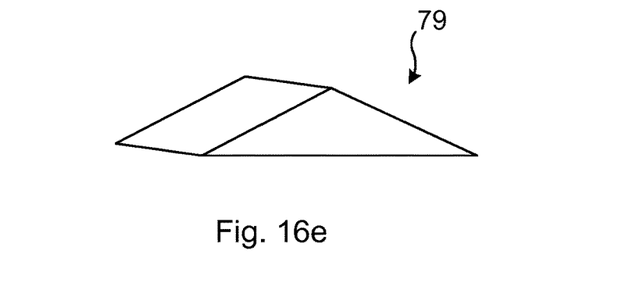
FIG. 16e schematically shows a perspective view of an example of a roof structure.

FIG. 16d shows another variation of the rack-mount box 1" shown in FIG. 16c. In this case, both the front wall 3c' and the rear wall 3d' are provided with hot air outlets 73. The cool air inlet 71 is provided in the front wall 3c' but could alternatively or additionally for example be provided in the bottom of the housing 3 similarly as shown in FIG. 16a. The roof structure 79 is V-shaped in this example. The roof structure 79 hence has the shape of an isosceles or equilateral triangle in a side sectional view. Each leg of the V is facing a respective hot air outlet 73. Each leg of the V hence extends from the vertex towards a respective one of the front wall 3c' and the back wall 3d'. FIG. 16e shows a perspective view of the V-shaped roof structure 79. The vertex of the "V" may be centred or may be arranged offset from the vertical centre axis between the front wall 3c' and the rear wall 3d'.

As an alternative to right-angled triangle shaped and V-shaped roof structures, the roof structure could for example be pyramid shaped, of the type shown in FIGS. 5 and 6. In this case, the side walls may also beneficially be provided with hot air outlets such that all facet surfaces of the pyramid shaped roof structure direct air towards a respective hot air outlet.

Figure 17:
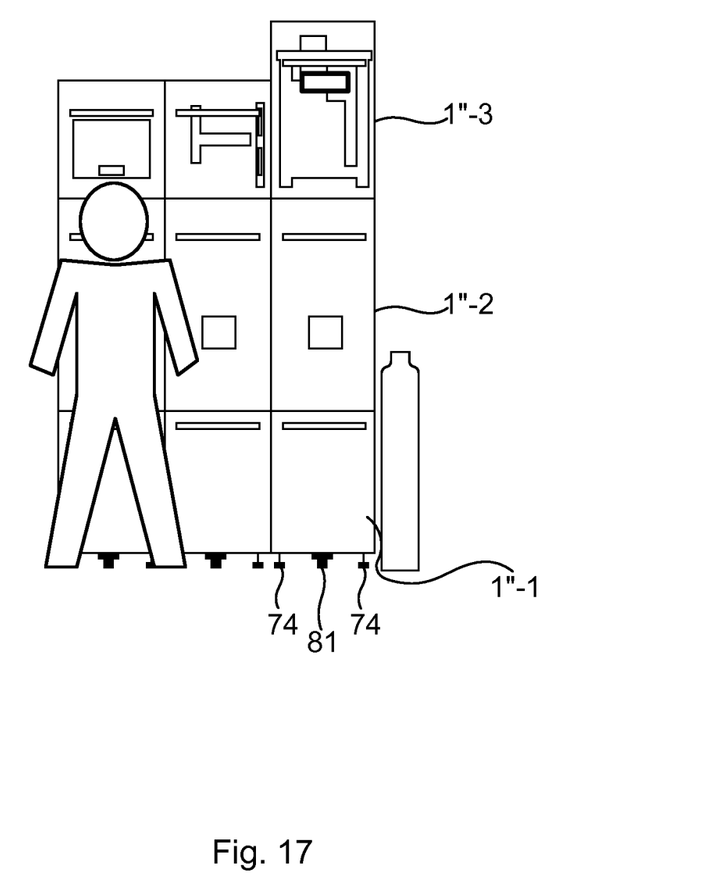
FIG. 17 schematically shows a front view of a rack-mount box assembly.

The rack-mount boxes 1" may beneficially be stacked on top of each other and/or arranged adjacent to and in contact with each other side by side to form a system of rack-mount boxes 1" or a rack-mount box assembly, as shown in FIG. 17 which shows a front view of such a system. The rack-mount boxes 1" may be connected to each other. For example, rack-mount boxes 1" stacked on top of each other may be connected mechanically and/or rack-mount boxes 1" arranged side by side may be connected to each other. In case the heat-emitting devices are electrolyser stacks, the capacity of the system is increased compared to a single electrolyser and may be used on an industrial scale in a compact manner.

In case two rack-mount boxes 1" are stacked on top of each other, the lower rack-mount box 1"-1 may be provided with stands 74 for placement of the rack-mount box 1"-1 on the ground. The lower rack-mount box 1" may have a support wheel 81 arranged between the stands 74. The support wheel 81 may for example form part of the heat-emitting device holding structure. The support wheel 81 may for example be connected to the tray and moved with the tray when the tray is pulled out from the housing 3' through the front wall 3c'. The support wheel may hence provide a median plane support when the tray is pulled out of the housing 3'.

The lower rack-mount box 1" may for example have a cool air inlet 71 in the bottom of the housing 3', similarly as shown in FIG. 16a. The middle rack-mount box 1"-2 may be placed directly on top of the lower rack-mount box 1"-1 without any stands. The middle rack-mount box 1"-2 may have its cool air inlet provided in the front wall 3c' vertically below its heat-emitting device holding structure. The middle rack-mount box 1"-2 may comprise a landing gear or support device that can be unfolded and connected to the tray of the lower rack-mount box 1"-1 when the tray of the middle rack-mount box 1"-2 is pulled out from the housing 3' of the middle rack-mount box 1"-2 and the tray of the lower rack-mount box 1" has been pulled out from its housing. In this case, the tray of the lower rack-mount box 1"-1 must first be pulled out, wherein the tray of the middle rack-mount box 1"-2 may be pulled out partly and the support device may be connected to the tray of the lower rack-mount box 1"-1 to provide support of the tray of the middle rack-mount box 1"-2 before pulling the middle tray further out. A similar support device is according to one example envisaged for the uppermost rack-mount box 1"-3. In this case, the sequence would be to first pull out the tray of the lower rack-mount box 1"-1, then pull out the tray of the middle rack-mount box 1"-2 and ensure support of the middle tray as described above. Finally, the tray of the uppermost rack-mount box 1"-3 would be pulled out and its support device would be connected to the tray of the middle rack-mount box 1"-2. This ensures that very heavy heat-emitting devices such as electrolyser stacks, pumps and power supplies could be pulled out from their housings while still being supported by the trays. In a typical set-up, the sizes of the rack-mount boxes may depend on the heat-emitting device contained therein. For example, one rack-mount box in a stack may contain an electrolyser stack, one may contain a pump and/or gas cannisters, and one may contain a power supply for the electrolyser stack and the pump.

The rack-mount boxes may also be arranged adjacent to each other side by side. In this case, the side walls between adjacent rack-mount boxes may be removed. These rack-mount boxes would thus have facing sides that are open towards each other. Several rack-mount boxes may thereby essentially form a common single heat-emitting device chamber comprising a plurality of heat-emitting devices with common air-cooling. The roof structures of rack-mount boxes 1" arranged side by side may be connected to each other. In this case, the roof structures are beneficially V-shaped or right-angled triangular shaped. The roof structure of the connected rack-mount boxes 1" hence form a single common connected roof structure. In one example, adjacent roof structures are arranged in physical contact with each other, without any space between them.

According to one variation, the roof structures of any rack-mount box which is not the uppermost rack-mount box 1" may be removed. In particular, the roof of the housing(s) may be removed except for the uppermost rack-mount-box 1". Further, according to one example, the cold air inlet may be provided only in a/the bottom rack-mount box, for example in the bottom of the lowermost housing.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A rack-mount box assembly comprising a first rack-mount box and a second rack-mount box, each for a heat-emitting device, and each configured to be rack-mounted in a rack, wherein each rack-mount box comprises:
   a housing forming a heat-emitting device chamber, wherein the housing comprises a plurality of planar walls and a roof structure, wherein the plurality of planar walls comprises a front wall, a rear wall, and side walls, wherein the side walls are removable, wherein each of the plurality of planar walls comprises a top side and a bottom side, and wherein the top side of the plurality of planar walls is coplanar with an uppermost side of the roof structure,
   a heat-emitting device holding structure arranged in the heat-emitting device chamber and configured to support a heat-emitting device, the heat-emitting device holding structure comprising a tray and a rail assembly configured to support or suspend the tray, the tray being configured to slide along the rail assembly such that the tray can be slid out from the housing, or a rail assembly onto which the heat-emitting device can be placed or suspended from directly, and
   a cool air inlet arranged entirely vertically below the heat-emitting device holding structure, configured to enable cool air to flow into the heat-emitting device chamber, the heat-emitting device holding structure being configured to enable cool air to flow vertically past the heat-emitting device holding structure,
   wherein at least one of the plurality of planar walls of the housing comprises a hot air outlet arranged vertically between the top side and the bottom side, and vertically above the heat-emitting device holding structure to enable heated air received into the heat-emitting device chamber as cool air via the cool air inlet to exit the heat-emitting device chamber,
   wherein the roof structure extends inwards in the heat-emitting chamber, the roof structure being configured to direct heated air in the heat-emitting device chamber towards the hot air outlet in the at least one of the plurality of planar walls of the housing,
   wherein the first and the second rack-mount box are arranged side by side, wherein the side walls between the first rack-mount box and the second rack-mount box have been entirely removed, wherein the heat-emitting device chamber of the first rack-mount box and the heat-emitting device chamber of the second rack-mount box are open towards each other to thereby form a common single heat-emitting device chamber, and wherein the roof structure of the first rack-mount box is arranged in physical contact with the roof structure of the second rack-mount box, without any space between.

2. The rack-mount box assembly of claim 1, wherein the roof structure is pyramid shaped, V-shaped or has the shape of a right-angled triangle.

3. The rack-mount box assembly of claim 1, wherein the roof structure has an inclined surface configured to direct heated air towards the hot air outlet.

4. The rack-mount box assembly of claim 1, wherein the roof structure is pyramid shaped, and wherein several non-parallel walls of the housing are provided with a hot air outlet, the pyramid shaped roof structure being configured to direct heated air to the hot air outlets.

5. The rack-mount box assembly of claim 1, wherein only one of the plurality of planar walls of the housing is provided with a hot air outlet, and wherein the roof structure has the shape of a right-angled triangle having its inclined surface in the form of a hypotenuse surface facing the hot air outlet.

6. The rack-mount box assembly of claim 1, wherein the cool air inlet is arranged in an underside of the housing or is provided in at least one of the plurality of planar walls of the housing.

7. The rack-mount box assembly of claim 6, wherein the cool air inlet is provided in the at least one of the plurality of planar walls of the housing.

8. The rack-mount box assembly of claim 6, wherein the cool air inlet, and the hot air outlet are provided in opposite ones of the plurality of planar walls of the housing.

9. The rack-mount box assembly of claim 1, wherein the housing is made of a heat-insulating material comprising polymer or wood.

10. The rack-mount box assembly of claim 1, wherein the hot air outlet enables heated air received into the heat-emitting device chamber as cool air via the cool air inlet to exit the heat-emitting device chamber without using a fan.

11. A heat-emitting device system comprising:
a first rack-mount box and a second rack-mount box, each rack-mount box configured to be rack-mounted in a rack, wherein each rack-mount box comprises:
a housing forming a heat-emitting device chamber, wherein the housing comprises a plurality of planar walls and a roof structure, wherein the plurality of planar walls comprises a front wall, a rear wall, and side walls, wherein the side walls are removable, wherein each of the plurality of planar walls comprises a top side and a bottom side, and wherein the top side of the plurality of planar walls is coplanar with an uppermost side of the roof structure,
a heat-emitting device holding structure arranged in the heat-emitting device chamber and configured to support a heat-emitting device, the heat-emitting device holding structure comprising a tray and a rail assembly configured to support or suspend the tray, the tray being configured to slide along the rail assembly such that the tray can be slid out from the housing, or a rail assembly onto which the heat-emitting device can be placed or suspended from directly, and
a cool air inlet arranged entirely vertically below the heat-emitting device holding structure, configured to enable cool air to flow into the heat-emitting device chamber, the heat-emitting device holding structure being configured to enable cool air to flow vertically past the heat-emitting device holding structure,
wherein at least one of the plurality of planar walls of the housing comprises a hot air outlet arranged vertically between the top side and the bottom side, and vertically above the heat-emitting device holding structure to enable heated air received into the heat-emitting device chamber as cool air via the cool air inlet to exit the heat-emitting device chamber,
wherein the roof structure extends inwards in the heat-emitting chamber, the roof structure being configured to direct heated air in the heat-emitting device chamber towards the hot air outlet in the at least one of the plurality of planar walls of the housing,
wherein the first and the second rack-mount box are arranged side by side, wherein the side walls between the first rack-mount box and the second rack-mount box have been entirely removed, wherein the heat-emitting device chamber of the first rack-mount box and the heat-emitting device chamber of the second rack-mount box are open towards each other to thereby form a common single heat-emitting device chamber, and wherein the roof structure of the first rack-mount box is arranged in physical contact with the roof structure of the second rack-mount box, without any space between; and
for each rack mount box, the heat-emitting device supported by or suspended from the heat-emitting device holding structure.

12. The heat-emitting device system of claim 11, wherein the heat-emitting device system is a high-pressure electrolyser system and the heat-emitting device is a high-pressure electrolyser stack.

13. The high-pressure electrolyser system of claim 12, wherein the electrolyser stack comprises a plurality of electrolytic cells, each electrolytic cell comprising two electrode plates wherein each electrode plate has a perimeter provided with heat fins.

14. The high-pressure electrolyser system of claim 12, wherein the electrolyser stack has an electrolyser cooling channel inlet and an electrolyser cooling channel outlet.

15. The high-pressure electrolyser system of claim 11, wherein the hot air outlet enables heated air received into the heat-emitting device chamber as cool air via the cool air inlet to exit the heat-emitting device chamber without using a fan.

* * * * *